United States Patent
Kurma et al.

(10) Patent No.: US 10,834,205 B2
(45) Date of Patent: Nov. 10, 2020

(54) NETWORK APPLIANCE HAVING FORWARDING TRAFFIC MODE TO REDUCE TRAFFIC LOSS AND RELATED METHODS

(71) Applicant: CITRIX SYSTEMS, INC., Fort Lauderdale, FL (US)

(72) Inventors: Jyotheesh Rao Kurma, Karnataka (IN); Saravana Annamalaisami, Karnataka (IN); Muthukumar Shunmugiah, Karnataka (IN); Saravanan Jayaraman, Karnataka (IN); Subash Dangol, Karnataka (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 227 days.

(21) Appl. No.: 16/012,963

(22) Filed: Jun. 20, 2018

(65) Prior Publication Data
US 2019/0394280 A1    Dec. 26, 2019

(51) Int. Cl.
*H04L 29/08* (2006.01)
*H04L 29/06* (2006.01)

(52) U.S. Cl.
CPC ............ *H04L 67/141* (2013.01); *H04L 69/16* (2013.01)

(58) Field of Classification Search
CPC ... H04L 67/10; H04L 67/141; H04L 67/2804; H04L 67/2814; H04L 67/42; H04L 69/16
See application file for complete search history.

(56) References Cited

U.S. PATENT DOCUMENTS

| | | | |
|---|---|---|---|
| 9,176,744 B2 | 11/2015 | Lee | |
| 9,538,345 B2 | 1/2017 | Sah et al. | |
| 2008/0046371 A1 | 2/2008 | He et al. | |
| 2010/0121972 A1 | 5/2010 | Samuels et al. | |
| 2011/0126192 A1 | 5/2011 | Frost et al. | |
| 2018/0069753 A1* | 3/2018 | Golshan | H04L 41/0803 |

(Continued)

OTHER PUBLICATIONS

Technical specification "Netscaler 10.1" (copyright 1999-2017) to Citrix. ("Citrix"). (Year: 2017).*

(Continued)

*Primary Examiner* — June Y Sison
(74) *Attorney, Agent, or Firm* — Allen, Dyer, Doppelt & Gilchrist, PA (57) ABSTRACT

A network appliance is provided for establishing sessions between client devices and a network server(s) for exchanging network traffic therebetween. The network appliance may include a memory and a processor cooperating with the memory, with the processor being operable in a normal traffic mode and a forwarding traffic mode. The processor may be configured to establish new sessions for network traffic based upon new session requests from the client devices, and forward network traffic associated with prior existing sessions from the client devices to the network server(s). When in the forwarding traffic mode, the processor may forward network traffic not associated with a prior existing session or a new session request to the network server(s). When in the normal traffic mode, the processor may block network traffic not associated with a prior existing session or a new session request from reaching the network server(s).

20 Claims, 7 Drawing Sheets

(56) References Cited

U.S. PATENT DOCUMENTS

2019/0342417 A1* 11/2019 Gerdfeldter ......... H04L 67/2814

OTHER PUBLICATIONS

Val King "What is Citrix Netscaler?" http://www.whitehatvirtual.com/blog/bid/347304/what-is-citrix-netscaler; retrieved from internet Jun. 19, 2018; pp. 3.

"What is an Application Delivery Controller (ADC)?" https://www.citrix.com/products/netscaler-adc/resources/what-is-an-adc.html; retrieved from Internet Jun. 19, 2018; pp. 63.

* cited by examiner

FIG. 7

NETWORK APPLIANCE HAVING FORWARDING TRAFFIC MODE TO REDUCE TRAFFIC LOSS AND RELATED METHODS

BACKGROUND

Network appliances are computing devices that manage the flow of information to other network-connected computing devices. Services that may be provided by a network appliance include firewall functions, caching, authentication, network address translation and IP address management, and load balancing, for example.

Application delivery controllers (ADCs) are one example of a network appliance implementation. More particularly, ADCs are networking appliances whose function is to improve the performance, security and resiliency of applications delivered over the web. One particularly advantageous ADC implementation is NetScaler ADC from the present Applicant Citrix Systems, Inc. of Ft. Lauderdale, Fla. NetScaler ADC is an application delivery controller that provides flexible delivery services for traditional, containerized and microservice applications from a data center or cloud service.

Another advantageous network appliance implementation is NetScaler Unified Gateway, also from Citrix Systems. The NetScaler Unified Gateway consolidates remote access infrastructure to provide single sign-on across various applications whether in a datacenter, in a cloud, or delivered as software as a service (SaaS).

SUMMARY

A network appliance is provided for establishing sessions between client devices and at least one network server for exchanging network traffic therebetween. The network appliance may include a memory and a processor cooperating with the memory, and the processor may be operable in a normal traffic mode and a forwarding traffic mode. The processor may be configured to establish new sessions for network traffic based upon new session requests from the client devices, and forward network traffic associated with prior existing sessions from the client devices to the at least one network server. When in the forwarding traffic mode, the processor may forward network traffic not associated with a prior existing session or a new session request to the at least one network server. When in the normal traffic mode, the processor may block network traffic not associated with a prior existing session or a new session request from reaching the at least one network server.

In an example implementation, the processor may be configured to create transparent sessions for the network traffic not associated with a prior existing session or a new session request when in the forwarding traffic mode. The processor may also be configured to forward the network traffic not associated with a prior existing session or a new session request to the at least one network server via another network appliance when in the forwarding traffic mode in some configurations.

In accordance with one example, the processor may be configured to initially operate in the forwarding traffic mode upon startup, and thereafter switch to the normal traffic mode after a time period. By way of example, the time period may be in a range of 250 milliseconds to 10 seconds.

In one example implementation, the processor may determine whether network traffic is associated with a new session request based upon Transmission Control Protocol (TCP) SYN packets associated with the network traffic. Furthermore, the processor may also be configured to perform Transmission Control Protocol (TCP) optimization for network traffic associated with new sessions. In accordance with an example implementation, the at least one network server may be a plurality of network servers, and the processor may be further configured to perform load balancing when creating new sessions with the plurality of network servers.

A related method is for establishing sessions between client devices and at least one network server for exchanging network traffic therebetween using a network appliance. The method may include establishing new sessions for network traffic based upon new session requests from the client devices, and forwarding network traffic associated with prior existing sessions from the client devices to the at least one network server. When in a forwarding traffic mode, network traffic not associated with a prior existing session or a new session request may be forwarded to the at least one network server. When in a normal traffic mode, network traffic not associated with a prior existing session or a new session request may be blocked from reaching the at least one network server.

A related non-transitory computer-readable medium is for a network appliance. The network appliance is for establishing sessions between client devices and at least one network server for exchanging network traffic therebetween. The non-transitory computer-readable medium may have computer-executable instructions for causing the network appliance to perform steps including establishing new sessions for network traffic based upon new session requests from the client devices, and forwarding network traffic associated with prior existing sessions from the client devices to the at least one network server. When in a forwarding traffic mode, network traffic not associated with a prior existing session or a new session request may be forwarded to the at least one network server, and when in a normal traffic mode, network traffic not associated with a prior existing session or a new session request may be blocked from reaching the at least one network server.

DETAILED DESCRIPTION

The present description is made with reference to the accompanying drawings, in which example embodiments are shown. However, many different embodiments may be used, and thus the description should not be construed as limited to the particular embodiments set forth herein. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
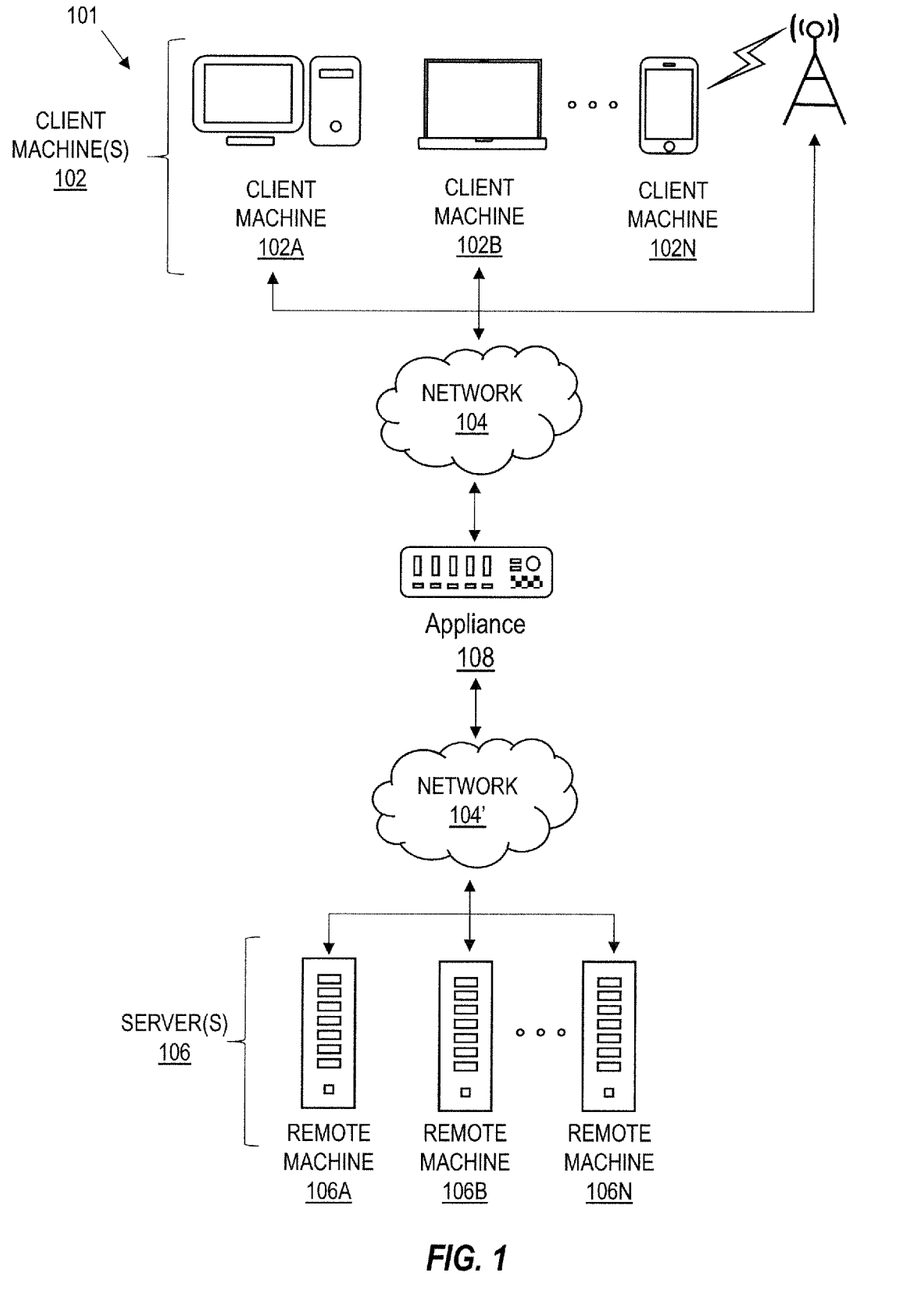
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
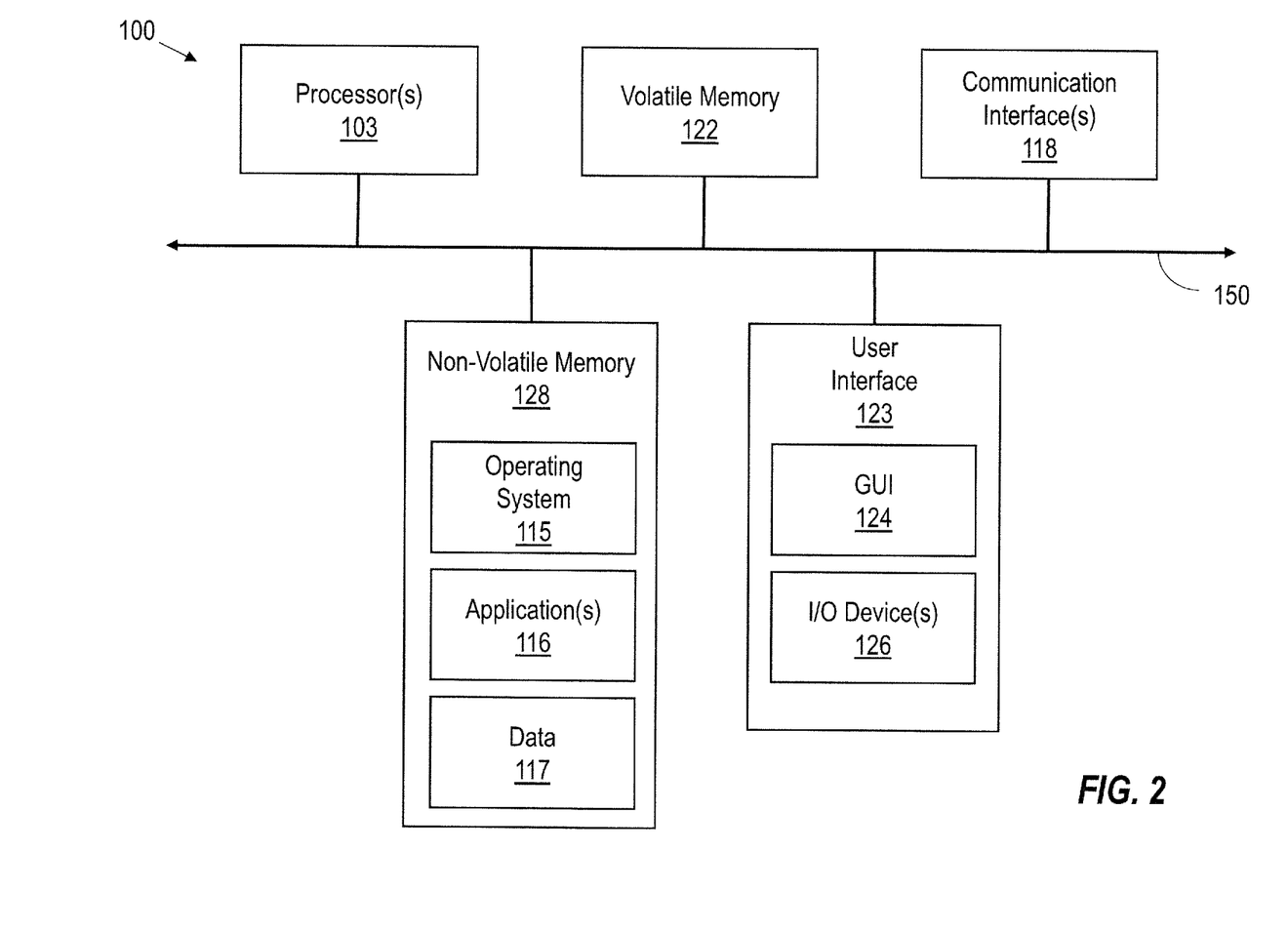
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
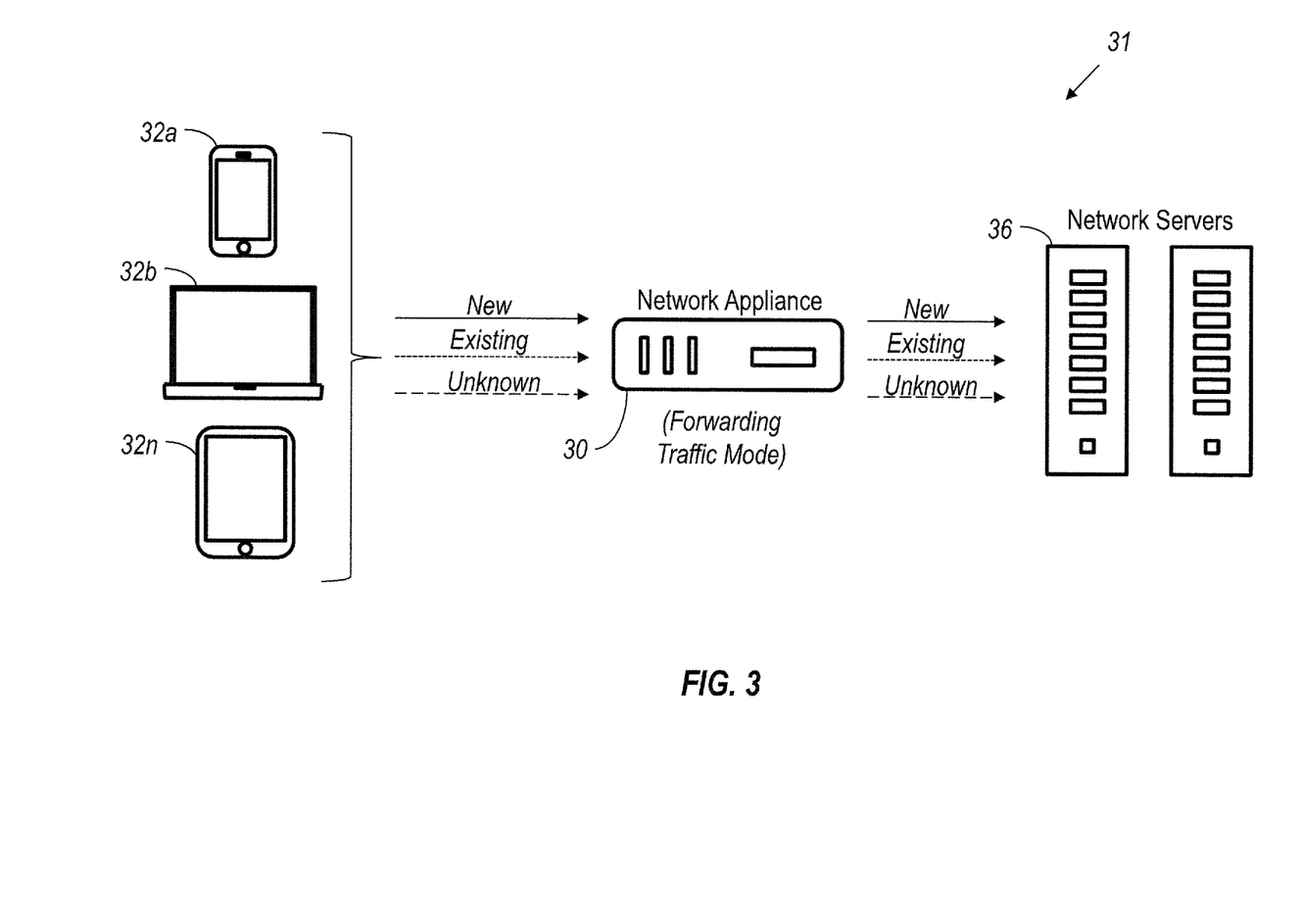
FIGS. 3 and 4 are block diagrams of a network computing system including a network appliance operating in a forwarding traffic mode and a normal traffic mode, respectively, in accordance with an example aspect.
Figure 4:
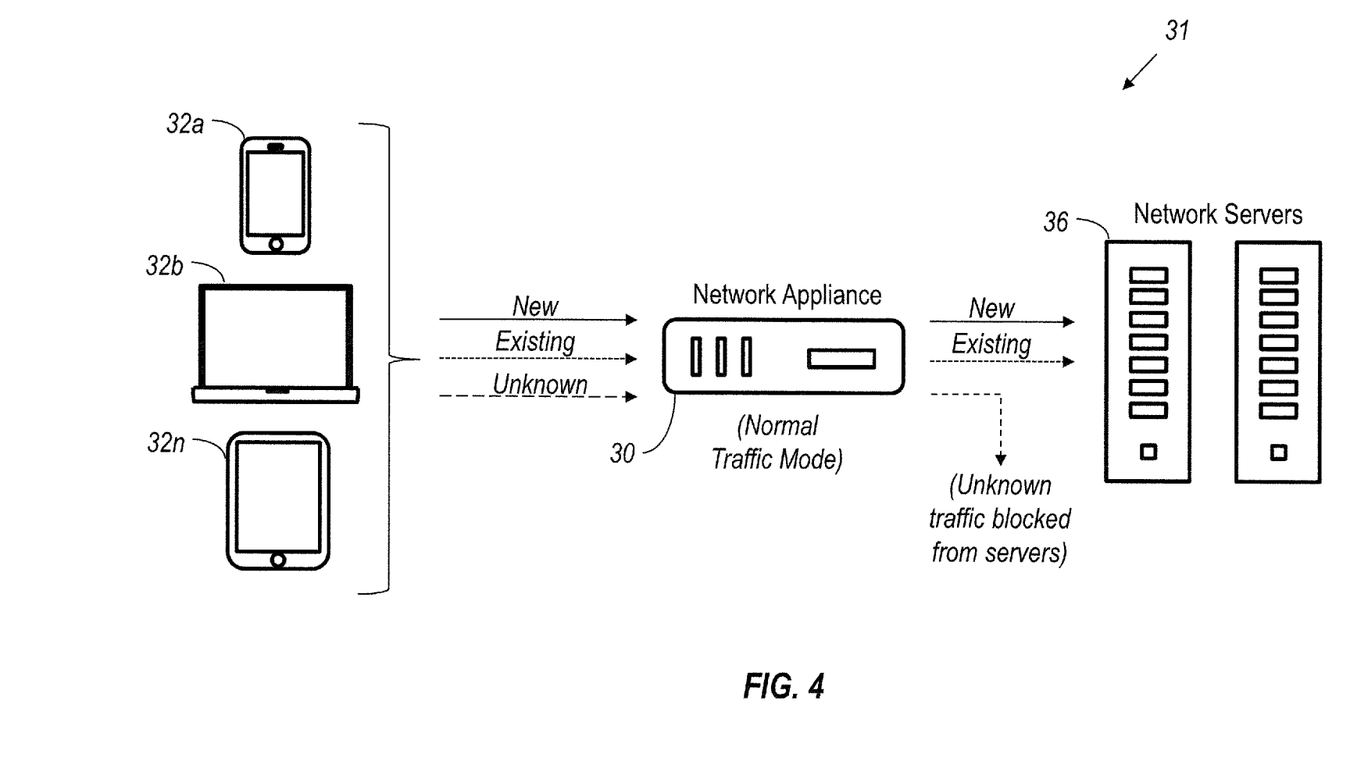
Figure 5:
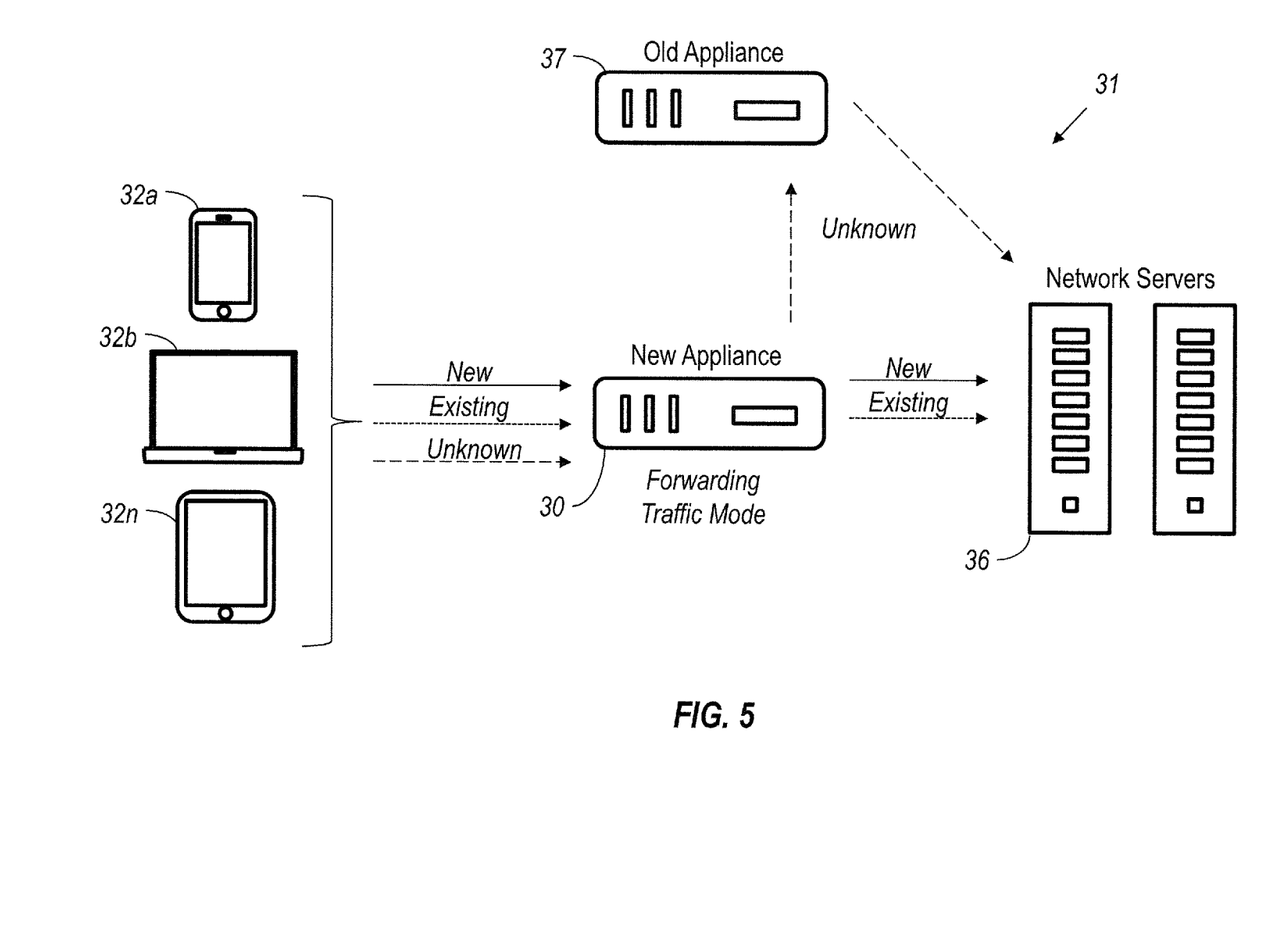
FIG. 5 is a block diagram of another implementation of the network computing system in accordance with an example implementation in which the network appliance is being operated in the forwarding traffic mode to replace an existing network appliance.
Figure 6:
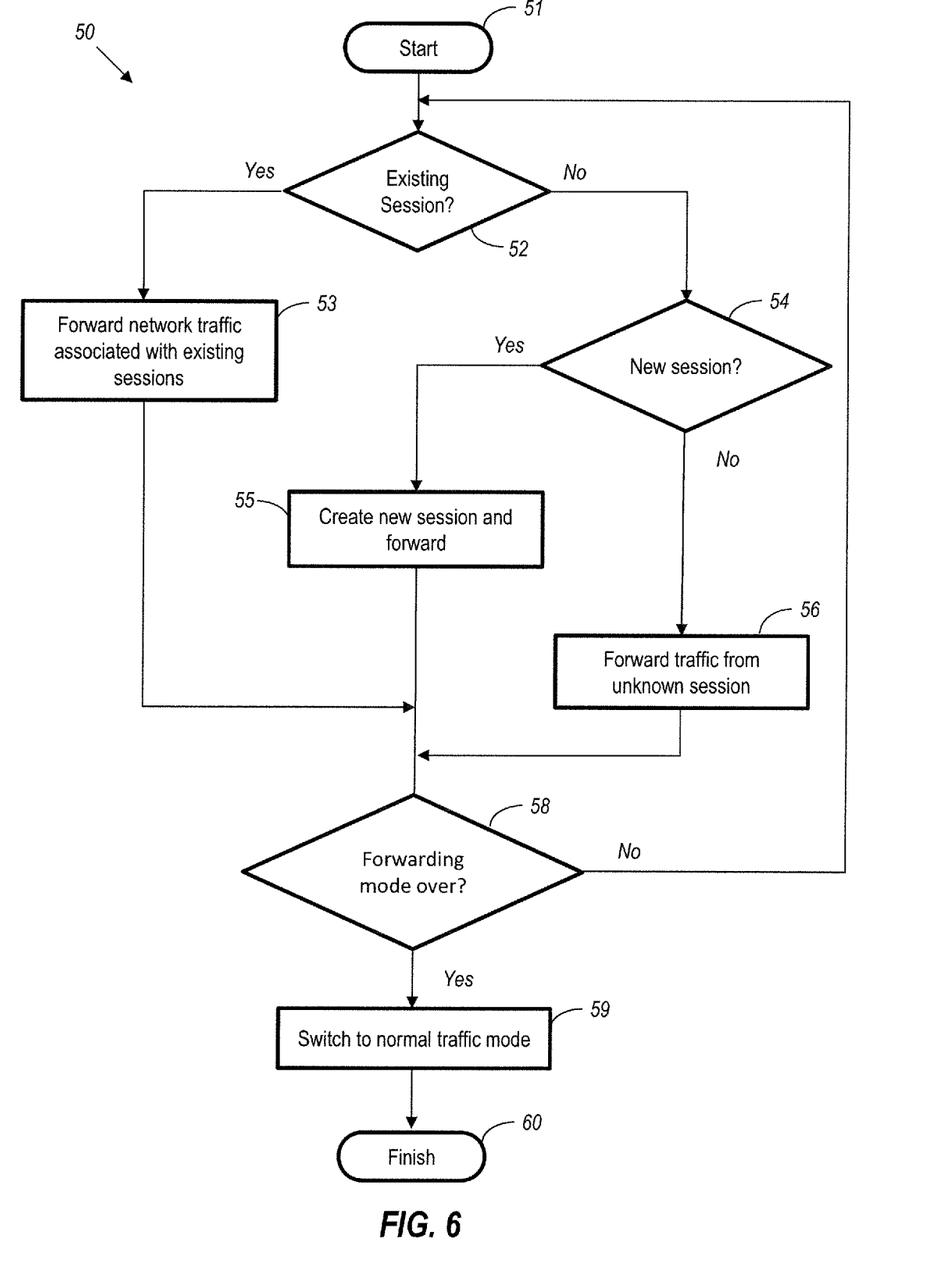
FIGS. 6-7 are flow diagrams illustrating method aspects associated with the configurations shown in FIGS. 3-5.

Turning now to FIGS. 3-5 and the flow diagram 50 of FIGS. 5 and 6, a network appliance 30 which provides enhanced upgrade or change flexibility within a computer network or system 31 and associated method aspects are first described. Generally speaking, the network appliance 30 establishes sessions between client devices 32*a*-32*n* (e.g., smartphones, laptop or desktop computers, tablet computers, etc.) and one or more network servers 36 for exchanging network traffic between the clients and servers. As discussed above with reference to FIG. 2, the network appliance 30 may include a memory and a processor cooperating with the memory for performing the various steps or operations described further below.

By way of background, network appliance implementations such as the above-noted NetScaler products from Citrix Systems typically provide for load balancing servers, firewalls, and caches in data centers, for example. However, over time new features and improvements are added to the network appliance products. In a traditional NetScaler ADC load balancing deployment for data centers, for example, NetScaler host virtual server IPs (VIPs) are placed in front of server farms or clusters. In a typical deployment, insertion/deletion/upgrade of NetScaler required DNS records to be updated, and some downtime was expected and updates would typically be performed during a planned maintenance window.

More recently, NetScaler implementations are being deployed in various other environments. For example, these may include deployments where a NetScaler appliance is functioning as a transparent TCP/HTTP/Application proxy. In such deployments, the NetScaler appliance does not host any VIPs, and it is neither placed close to client devices 32*a*-32*n* nor the servers 36, but rather is inserted somewhere in the path between them. Part of TCP/HTTP/Application proxy functionality includes Denial of Service (DoS) protection, and TCP/HTTP/Application level optimization. This is typically done by intercepting the traffic transparently and by making changes to the traffic such as TCP sequence number changes, TCP/HTTP/Application data parsing, re-writing, buffering, etc. Generally speaking, a NetScaler implementation would need to see the TCP flow/connection from the beginning of the connection. Any traffic/flow that belongs to a mid-connection, which the NetScaler implementation is not aware of, would otherwise be blocked or torn down, and accordingly not allowed to reach the network servers 36 for security reasons.

However, this may pose difficulties when a NetScaler appliance (or other network appliance) is being newly inserted into a network, as it would undesirably tear down existing traffic flows. Similar problems may occur with respect to a graceful removal of an appliance from a network. As explained above, if an appliance alters the TCP aspects of network traffic as part of TCP/HTTP/Application proxy functionality, if that appliance is removed suddenly then the connection between the client and server will be disrupted. Thus, in theory, to remove such a network appliance one would need to wait until all of the prior existing traffic session flows get closed. Yet, in real time this is difficult if not impossible to accomplish, as there will be a continuous flow of new connections all the time.

Further still, similar problems may exist if a customer wants to upgrade the network appliance hardware or software. That is, when the new high performance hardware or software is inserted in the network, all of the traffic will be directed to this new device. Here again, the new appliance will undesirably tear down existing flows handled by the old hardware. Similar problems may also exist with network appliances for cloud deployments, where operational requirements may be such that services need to be up and running continuously with essentially no downtown permitted.

In accordance with an example implementation, the network appliance 30 may advantageously be operable in a normal traffic mode as well as a forwarding traffic mode to help overcome the above-noted traffic transition difficulties. As noted above, in a normal operating mode involving a typical transparent TCP/HTTP/Application Proxy deployment at a NetScaler appliance, for example, the appliance would need to know of a prior existing session/traffic flow from its beginning. Otherwise, it would block such prior connections since it is not aware of their existence. This normal mode of operation is shown in FIG. 4, where it may be seen that the "unknown" traffic from the client devices 32a-32n is blocked from reaching the network servers 36. Only through existing sessions or connections the network appliance 30 is already aware of, or newly established sessions created by the network appliance 30 responsive to new session requests, is network traffic allowed to pass to the network servers 36 in the normal operating mode.

Figure 7:
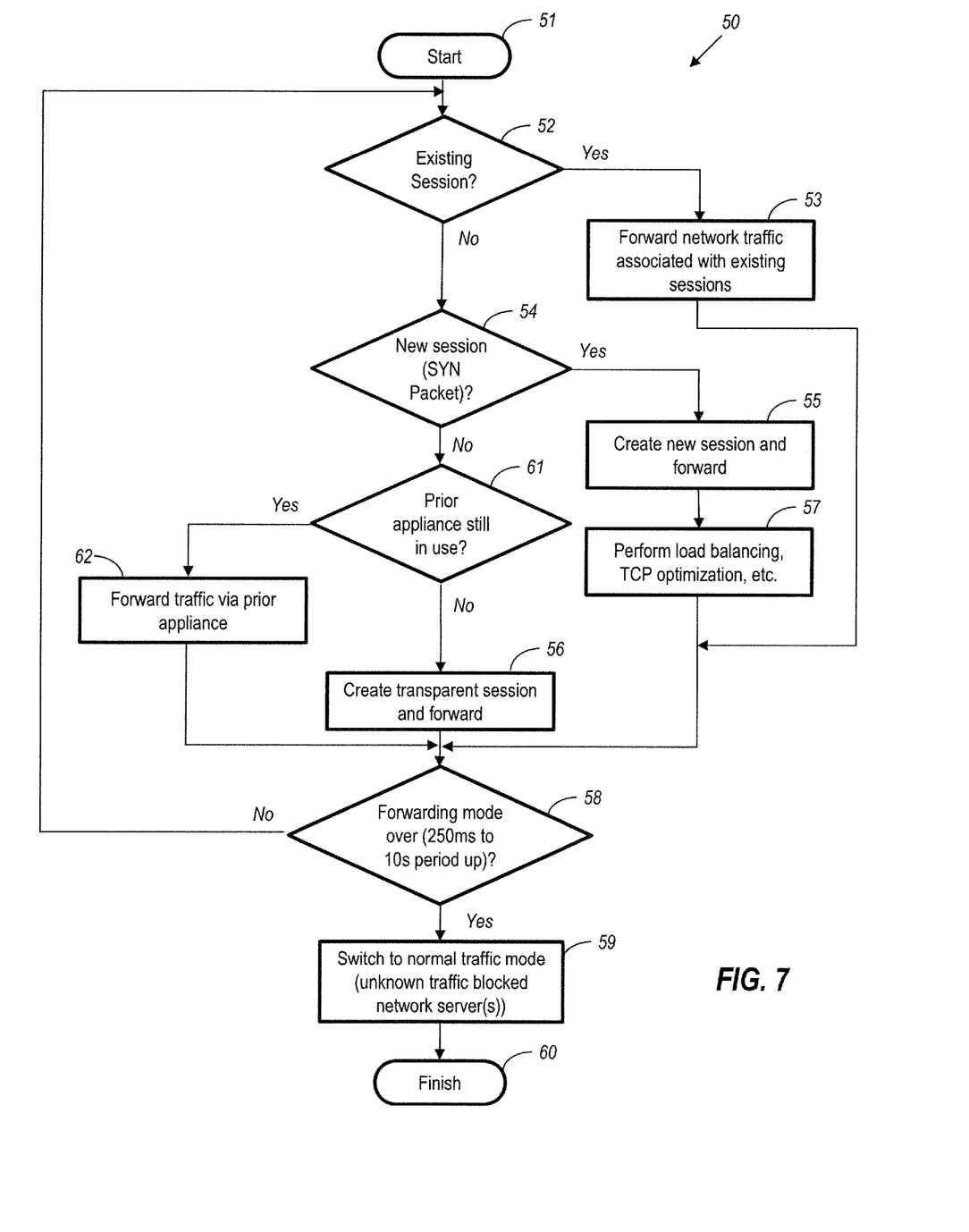

Beginning at Block 51, in the forwarding traffic mode, the network appliance 30 also forwards network traffic associated with prior existing sessions from the client devices 32a-32n to the network server 36, at Blocks 52-53. Moreover, at Block 54, the network appliance 30 may also determine if incoming traffic not associated with a previously known session is a new session request (which may be done based upon examination of a TCP SYN packet, for example, as shown in FIG. 7), and if so it establishes a new session for forwarding the network traffic accordingly, at Block 55.

However, when in the forwarding traffic mode as shown in FIG. 3, the network appliance 30 may advantageously forward network traffic not associated with a prior existing session or a new session request (i.e., "unknown" traffic) to the network servers 36, at Block 56. In accordance with one example implementation, transparent sessions may be established for such flows, as seen in FIG. 7. By "transparent" it is meant that traffic for these sessions would simply be pass-through traffic, and the network appliance 30 may avoid performing one or more traffic enhancement operations such as load balancing, TCP optimization, DoS protection, etc. (Block 57 in FIG. 7), as will be discussed further below. This advantageously stops the disturbance associated with a loss of traffic for existing flows that are unknown to the network appliance 30 (which may be the case because the network appliance has just been installed or upgraded, for example), while new flows/connections will receive the benefit of normal proxy functionality.

The forwarding traffic mode may therefore advantageously be used when the network appliance 30 first comes online (e.g., after a hardware or software upgrade), during which time a transition is occurring from prior sessions not established by the network appliance 30 to a point when all active sessions will have been established by the network appliance. In this regard, the forwarding traffic mode may also be considered a bridge mode or switch over mode, for example.

On the other hand, it is generally desirable that the forwarding traffic mode not be left on indefinitely or for extended periods, as this may pose security risks from the unknown traffic. As such, the network appliance 30 may remain in the forwarding traffic mode for a relatively short duration or time period (Block 58) from the time that the network appliance comes online. In accordance with one example implementation, this duration may be in a range of 250 milliseconds to 10 seconds, although other durations may be used in different embodiments.

The forwarding traffic mode may be turned off automatically after the given duration by switching to the normal traffic mode (Block 59), by which time it is expected that the existing flows will be registered with the network appliance 30 either as new sessions or transparent sessions, as noted above. With this approach, the existing flows (which are initially unknown to the network appliance 30) are not torn down and continue to flow, while the new flows will benefit from enhanced routing operations (e.g., load balancing, TCP optimization, TCP/HTTP/Application proxy benefits, DoS protection, etc.).

In other implementations, the forwarding traffic mode may be used at some time after startup. For example, this mode may be used when the network appliance 30 is being removed from the network 31. Sometime before removal from the network 31, the network appliance 30 may be placed into a bridging mode to create transparent sessions for new flows. After the designated duration, once all the existing flows are finished, the network appliance may then be safely removed or bypassed.

In the case where the network appliance 30 is being used to replace a previously installed or old appliance 37 (FIG. 5), all network traffic may initially be diverted to the new network appliance. In this implementation where the old appliance 37 will remain operational for some time, rather than create transparent sessions as discussed above, the new network appliance 30 may instead divert all of the "unknown" traffic to the old appliance 37 to handle. Since the sessions this traffic is associated will be known to the old appliance 37 (if it is legitimate traffic), the old appliance may accordingly process and forward the traffic as it ordinarily would. The old appliance 37 may be kept operational for a sufficient time to allow the existing flows to be closed. This may be determined based upon a set time limit, or by waiting a certain period after the last unknown traffic is received, for example.

Accordingly, the above-described approach may advantageously allow for inserting, removing and upgrading a network appliance in a transparent fashion with little or no disturbances to network traffic flow. As such, a "hitless" deployment or migration of network appliances may be achieved with regard to lost or dropped network traffic session and network downtime.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A network appliance for establishing sessions between client devices and at least one network server for exchanging network traffic therebetween, the network appliance comprising:
    a memory; and
    a processor cooperating with the memory and operable in a normal traffic mode during normal operation, and a forwarding traffic mode upon startup of the network appliance, the processor configured to
        establish new sessions for network traffic based upon new session requests from the client devices,
        forward network traffic associated with prior existing sessions from the client devices to the at least one network server,
        upon startup of the network appliance during a continuous flow of new session requests, enter the forwarding traffic mode and forward unknown network traffic not associated with a prior existing session or a new session request to the at least one network server so that the unknown network traffic is not blocked from reaching the at least one network server during the startup, and in the normal traffic mode, block the unknown network traffic not associated with a prior existing session or a new session request from reaching the at least one network server.

2. The network appliance of claim 1 wherein the processor is configured to create transparent sessions for the network traffic not associated with an existing session or a new session request when in the forwarding traffic mode.

3. The network appliance of claim 1 wherein the processor is configured to forward the network traffic not associated with an existing session or a new session request to the at least one network server via another network appliance when in the forwarding traffic mode.

4. The network appliance of claim 1 wherein the processor is configured to switch to the normal traffic mode after a time period.

5. The network appliance of claim 4 wherein the time period is in a range of 250 milliseconds to 10 seconds.

6. The network appliance of claim 1 wherein the processor is configured to determine whether network traffic is associated with a new session request based upon Transmission Control Protocol (TCP) SYN packets associated with the network traffic.

7. The network appliance of claim 1 wherein the processor is further configured to perform Transmission Control Protocol (TCP) optimization for network traffic associated with new sessions.

8. The network appliance of claim 1 wherein the at least one network server comprises a plurality of network servers, and wherein the processor is further configured to perform load balancing when creating new sessions with the plurality of network servers.

9. A method for establishing sessions between client devices and at least one network server for exchanging network traffic therebetween using a network appliance, the method comprising:
establishing new sessions for network traffic based upon new session requests from the client devices;
forwarding network traffic associated with prior existing sessions from the client devices to the at least one network server;
upon startup of the network appliance during a continuous flow of new session requests, entering a forwarding traffic mode and forwarding unknown network traffic not associated with a prior existing session or a new session request to the at least one network server so that the unknown network traffic is not blocked from reaching the at least one network server during the startup; and
in a normal traffic mode, blocking the unknown network traffic not associated with a prior existing session or a new session request from reaching the at least one network server.

10. The method of claim 9 further comprising creating transparent sessions for the network traffic not associated with an existing session or a new session request when in the forwarding traffic mode.

11. The method of claim 9 wherein, when in the forwarding traffic mode, the network appliance forwards the network traffic not associated with an existing session or a new session request to the at least one network server via another network appliance.

12. The method of claim 9 further comprising switching to the normal traffic mode after a time period.

13. The method of claim 9 further comprising determining whether network traffic is associated with a new session request based upon Transmission Control Protocol (TCP) SYN packets associated with the network traffic.

14. The method of claim 9 further comprising performing Transmission Control Protocol (TCP) optimization for network traffic associated with new sessions.

15. The method of claim 9 wherein the at least one network server comprises a plurality of network servers, and further comprising performing load balancing when creating new sessions with the plurality of network servers.

16. A non-transitory computer-readable medium for a network appliance, the network appliance for establishing sessions between client devices and at least one network server for exchanging network traffic therebetween, the non-transitory computer-readable medium having computer-executable instructions for causing the network appliance to perform steps comprising:
establishing new sessions for network traffic based upon new session requests from the client devices;
forwarding network traffic associated with prior existing sessions from the client devices to the at least one network server;
upon startup of the network appliance during a continuous flow of new session requests, entering a forwarding traffic mode and forwarding unknown network traffic not associated with an existing session or a new session request to the at least one network server so that the unknown network traffic is not blocked from reaching the at least one network server during the startup; and
in a normal traffic mode, blocking the unknown network traffic not associated with an existing session or a new session request from reaching the at least one network server.

17. The non-transitory computer-readable medium of claim 16 further having computer-executable instructions for causing the network appliance to create transparent sessions for the network traffic not associated with an existing session or a new session request when in the forwarding traffic mode.

18. The non-transitory computer-readable medium of claim 16 further having computer-executable instructions for causing the network appliance to, when in the forwarding traffic mode, forward the network traffic not associated with an existing session or a new session request to the at least one network server via another network appliance.

19. The non-transitory computer-readable medium of claim 16 further having computer-executable instructions for causing the network appliance to switch to the normal traffic mode after a time period.

20. The non-transitory computer-readable medium of claim 16 further having computer-executable instructions for causing the network appliance to determine whether network traffic is associated with a new session request based upon Transmission Control Protocol (TCP) SYN packets associated with the network traffic.

* * * * *